US012238510B2

(12) United States Patent
Fan et al.

(10) Patent No.: US 12,238,510 B2
(45) Date of Patent: Feb. 25, 2025

(54) LIGHT-BASED SPATIAL AUDIO METERING

(71) Applicant: Sphere Entertainment Group, LLC, New York, NY (US)

(72) Inventors: Yuan-Yi Fan, Los Angeles, CA (US); Neil Andrew Wakefield, San Francisco, CA (US)

(73) Assignee: Sphere Entertainment Group, LLC, New York, NY (US)

( * ) Notice: Subject to any disclaimer, the term of this patent is extended or adjusted under 35 U.S.C. 154(b) by 0 days.

(21) Appl. No.: 18/614,116

(22) Filed: Mar. 22, 2024

(65) Prior Publication Data

US 2024/0276173 A1 Aug. 15, 2024

Related U.S. Application Data

(63) Continuation of application No. 17/811,633, filed on Jul. 11, 2022, now Pat. No. 11,956,624.

(51) Int. Cl.
*H04R 7/00* (2006.01)
*H04S 7/00* (2006.01)

(52) U.S. Cl.
CPC .................................... *H04S 7/40* (2013.01)

(58) Field of Classification Search
CPC .............. H04S 7/40; H04R 3/12; H04R 1/323
USPC .................................................. 381/303, 306
See application file for complete search history.

(56) References Cited

U.S. PATENT DOCUMENTS 5,210,802 A * 5/1993 Aylward .................. H04R 5/02
381/387
11,205,303 B2 12/2021 Schowengerdt et al.
11,902,773 B1 2/2024 Fan et al.
11,956,624 B2 4/2024 Fan
2006/0117261 A1 6/2006 Sim et al.
2012/0041579 A1* 2/2012 Davis ..................... H04R 1/403
700/94
2012/0047435 A1 2/2012 Holladay et al.
2012/0133899 A1 5/2012 Chiang
2020/0053320 A1 2/2020 Mor et al.
(Continued)

OTHER PUBLICATIONS

International Search Report and Written Opinion directed to related International Application No. PCT/US2023/074906, mailed Feb. 4, 2024; 14 pages.
(Continued)

*Primary Examiner* — Vivian C Chin
*Assistant Examiner* — Douglas J Suthers
(74) *Attorney, Agent, or Firm* — Sterne, Kessler, Goldstein & Fox P.L.L.C.

(57) ABSTRACT

Disclosed herein are system, method, and computer program product embodiments for visualizing sound coverage in a venue. An embodiment operates by receiving audio content from an audio source, determining audio signal properties of the audio content, where the audio signal properties comprise one or more spectral, temporal, spatial components (e.g., energy, spectrum or directivity), receiving an audio system configuration of loudspeakers or sound beams of a venue, visualizing the audio signal based on a mapping of an intersection of a unique volumetric beam of colored light, representing the spectral, temporal, spatial components, with a portion of the venue and displaying the visualized audio signal as a virtual representation of sound coverage of the portion of the venue.

20 Claims, 14 Drawing Sheets

(56) References Cited

U.S. PATENT DOCUMENTS

| | | | | |
|---|---|---|---|---|
| 2020/0187332 | A1* | 6/2020 | Mizerak | H05B 47/19 |
| 2020/0312033 | A1 | 10/2020 | Ohashi | |
| 2020/0326784 | A1 | 10/2020 | Isaacs et al. | |
| 2022/0329765 | A1 | 10/2022 | Shanmugam et al. | |
| 2023/0232153 | A1* | 7/2023 | Sørensen | H04R 3/12<br>381/303 |
| 2024/0015467 | A1 | 1/2024 | Fan et al. | |
| 2024/0048674 | A1 | 2/2024 | Mohar Castillo et al. | |

OTHER PUBLICATIONS

D&b Audiotechnik Gmbh: "TI 385 (4.2 EN) d&b Line array design, ArrayCalc V7", Mar. 1, 2014 (Mar. 1, 2014), XP055495833; 58 pages.

Feistel et al., "Adapting Loudspeaker Array Radiation to the Venue using Numerical Optimization of FIR Filters," Convention paper 8937, Audio Engineering Society, Presented at the 135th Convention, Oct. 17-20, 2023, New York, USA, XP093164798; 10 pages.

Ahnert Feistel Media Group, "EASE Focus Version 3—User's Guide" A Simulation Software by AFMG, Feb. 28, 2019, XP093072376; 82 pages.

* cited by examiner

LIGHT-BASED SPATIAL AUDIO METERING

CROSS REFERENCE TO RELATED APPLICATIONS

This application is a continuation of U.S. Non-Provisional patent application Ser. No. 17/811,633, filed Jul. 11, 2022, now allowed, which is herein incorporated by reference in its entirety.

BACKGROUND

Conventional audio metering techniques often assume an audio output device has limited spatial capabilities. Existing metering solutions are generally channel-based, object-based, or a combination of both. Most object-based metering solutions visualize scalar data by uniformly color-mapping a virtual sound emitter's surface, which implies that it is either emitting sound in all directions or has no directivity control. Therefore, they don't provide enough information that characterizes spatial capabilities of a loudspeaker array or loudspeaker arrays using spatial audio rendering techniques, such as audio beamforming.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 1:
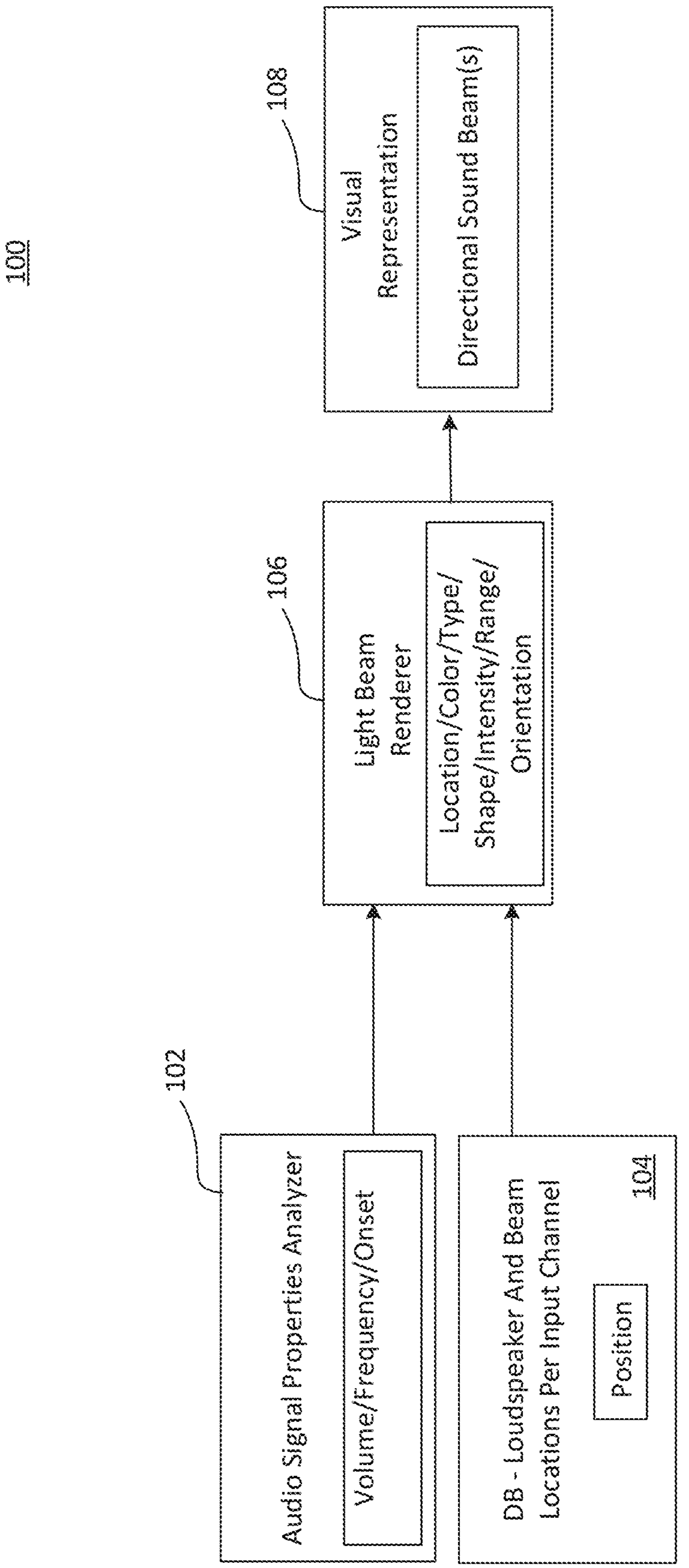
FIG. 1 illustrates a block diagram of a light beam rendering system, according to some embodiments.

Provided herein are system, apparatus, device, method and/or computer program product embodiments, and/or combinations and sub-combinations thereof, for providing a visual representation of loudspeaker sound coverage.

In some embodiments, the technology described herein implements volumetric visualization of a focused light source to provide acoustic path information among sound sources, loudspeakers and listeners. A diffused light source may be used to visualize an acoustic spread of a sound source or spatial clustering of activated channels.

In some embodiments, the technology implements visualizing spatial capabilities of an audio output device using properties of light. This allows for intuitive metering of both scalar and vector outputs of the device. Scalar data is defined as a quantity that has magnitude but no direction. Vector data is defined as a quantity that has both magnitude and acts in a particular direction. Scalar visualization is a visualization technique that maps scalar data to an object's color or size. With the disclosed vector visualization technique, spatial information, such as acoustic coverage, can also be visually represented by mapping vector data to properties of light.

In some embodiments, the technology described herein implements a visualization technique ("Beam Renderer") in a software application ("Audio Visualizer") to provide a visual representation of a loudspeaker array sound coverage pattern within a venue. For example, the audio visualizer will illustrate a sound distribution, or distribution of one or more components of the sound, for one or more seat sections of the venue. For a venue, knowing the distribution of sound improves a potential performance delivery, for example, a desired sound coverage (volume, bass, midrange, treble, and vocals, etc.). Each speaker set or array may be mapped to a corresponding sound coverage as it would arrive at one or more seating sections of the venue and be heard by patrons of these seating sections. In some embodiments, a goal of ensuring that every seat has some sound coverage may be met through the visualization techniques as described herein. In some embodiments, specific audio content may be directed to a desired seating section during, for example, an interactive live show.

In some embodiments, the technology described herein generates, stores and subsequently retrieves spatial configurations of sound sources and loudspeakers from a database. A beam renderer visualizes a spatial audio output of the retrieved configurations using properties of light.

In some embodiments, the technology described herein visualizes directional sound using the vector nature of light. It provides visualized sound emissions with various degrees of directivity, from omnidirectional to unidirectional. Transforms in this visualization technique may include, but are not limited to, color, intensity (e.g., brightness), directivity (e.g., angle, shape, focus and diffusion), steering (e.g., movement), and coverage (e.g., radius, shape, aspect ratio of projected area, or a custom projected area).

In some embodiments, the technology described herein implements monitoring of spatialization algorithms, spatial clustering of activated audio channels, and spatial stem mixing and mastering in a 2D (two-dimensional) display, and is applicable to Extended Reality (XR), including, but not limited to, Virtual Reality (VR), Augmented Reality (AR), and Mixed Reality (MR). A MR experience combines elements of both Augmented Reality (AR) and Virtual Reality (VR), where real-world and digital objects interact. For example, one can visually meter spatial characteristics of an acoustic output from a loudspeaker array or loudspeaker arrays on-site with a MR-enabled goggle (e.g., Head-Up Display (HUD)). As acoustic transmission is invisible, a visual overlay of sound propagation is virtually visualized as light propagation onto physical objects, such as a seating area. This visualization can facilitate on-site tasks. Specifically, visualization of acoustic path, volume, coverage, and overlap using properties of light in MR provides critical visual aids for audio system calibration and acoustic choreography previews.

In some embodiments, the technology described herein implements visualizing spatial capabilities of a loudspeaker array or loudspeaker arrays using the properties of light. This technology may be deployed and scaled to systems with various loudspeaker configurations and display outputs, including, for example, a two-dimensional (2D), a virtual reality (VR) three-dimensional display, or a spherical display. For future systems with increasingly larger channel counts, this technology provides visualization grouping of large audio channel outputs by their properties using light color mixing.

Unlike wave propagation visualization techniques, the technology described herein implements both computationally efficiency and intuitive metering of a loudspeaker array or loudspeaker arrays with variable directivity. With the described vector visualization technique, spatial information can be visually represented by mapping directional sound to light beams. The vector nature of this technology extends its applicability regardless of a type of spatial audio rendering.

In some embodiments, the technology described herein implements visualization of acoustic coverage using properties of light with a sound stem file that can be visualized as sound objects with light beams, where each beam is assigned a different hue value. A stem file is a track that is split into four musical elements, such as drum, bass, melody, and vocal. The beam changes its color by mapping rhythmic variations in source content to monochromatic colors of its hue value. Rhythmic variations can be any music information metric that has certain level of regularity over a period of time. Rhythmic variations can be extracted using audio analysis. The beam points from sound objects to seating areas, where its projected area indicates acoustic coverage of source content. Intersection of projected areas indicates acoustic coverage overlap and is visualized based on additive color mixing of the light beams.

An embodiment operates by receiving audio content from an audio source, determining audio signal properties of the audio content, where the audio signal properties comprise one or more spectral, temporal, spatial components (e.g., energy, spectrum or directivity).

FIG. 1 illustrates a sound visualization system 100 to process and analyze one or more audio sources to generate a visual representation of sound coverage, according to an example embodiment. Sound visualization system 100 can be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. Sound visualization system 100 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the sound visualization system 100 or installed as a removable portion of the sound visualization system 100.

The following FIG. 1 descriptions are provided at a high level for an overall understanding with greater detail provided in the descriptions that follow. In some embodiments, sound visualization system 100 implements a visualization representation of one or more loudspeaker arrays or sound beams located within a venue. Sound visualization system 100 retrieves and analyzes audio content from audio sources for signal properties, retrieves spatial configurations of sound sources (e.g., loudspeakers) from a database and visualizes the spatial audio output of the retrieved configurations based on the sound sources and loudspeaker placements within a venue using properties of light.

Audio signal properties analyzer 102 receives desired audio content from an audio source. Audio sources may be a library of audio content, an external device with stored audio content, a streaming source, or a software package which produces the audio signals to be analyzed and visualized. Common examples are Digital Audio Workstation (DAW) software packages and audio playback servers. In some embodiments, the audio source of specific audio content may be employed to generate a variety of different visual mappings for a venue. In some embodiments, a mapping of specific audio content, for example, to be part of a live presentation at the venue, may be tested or previewed to determine sound coverages for the various seating sections of the venue throughout the live presentation. Audio signal properties analyzer 102 analyzes the audio content for its audio signal properties, such as, but not limited to frequency, wavelength, period, and amplitude (volume), pitch, or modulation. Alternatively, or in addition to, a generic speaker array visual mapping may be implemented using generic test audio content to assess a generalized speaker array sound distribution within a venue. For example, audio signals may be configured as an audio source set of mono audio signals formatted for the specific audio system being visualized.

A database (DB) 104 of loudspeaker and sound beam locations (i.e., audio system configuration), per input channel, for a venue provides a mapping of a specific venue's speaker/beam locations and parameters. Parameters may include, but are not limited to, positions and orientations of loudspeakers, number of speakers, arrangement (e.g., array), power, sound distribution type (e.g., diffused, directional, etc.), distortion, etc. In one non-limiting example, an audio system configuration for the venue may reflect one or more sets of loudspeakers and beams arranged in one or more arrays of varying numbers, sizes, types and power outputs. In some embodiments, an audio system configuration is a package of fixed data specifying the geometric properties of the speaker systems being metered. In a non-limiting example, the geometric properties may be the locations and orientations of the individual speakers or beams comprising the system, and their capabilities and coverage patterns. This information may be used to initially create the audio signals within the audio source and to map the resulting signals into three dimensions at the visualization stage.

Light beam renderer 106 may implement a volumetric light renderer to render (i.e., draw) a light beam which represents the audio signal. The light beam renderer 106 may render beams based on various attributes, such as, location, color, orientation, type, shape, intensity or range, to name a few. The shape and location of the light beam is specified by the audio system configuration. The color and intensity of the light beam is a direct representation of the incoming audio signal properties for that sounds source. The type may be based on the type of sound source. In a non-limiting example, the type of sound source may include types of loudspeakers (e.g., omnidirectional, directional, etc.), beams, sizes, array shapes, power considerations, etc.). An audio monitoring system (FIG. 3, element 328), not shown in FIG. 1, provides an external listening system used in parallel to a metering tool to listen to the signals produced by the audio source. Light beam renderer 106 may implement a signal processor to read the audio signals in real-time and emit simplified signals that can be used to drive metering visualizations, such as an instantaneous level of the overall signal and its frequency components. In various embodiments, the audio source may either be the actual audio system being metered, or an acoustic model (e.g., simulation) of this system, such as a binaural renderer.

In some embodiments, light beam renderer 106 is configured as a three-dimensional (3D) visualization renderer that synthesizes a 3D representation of the audio system and its metered data. The visual representation 108 is a combination of a static scene (e.g., venue seating) and a light-based beam overlay of sound coverage from one or more sound sources within a venue as shown in FIGS. 2-5. In some embodiments, to render a static scene for the visual representation, the light beam renderer 106 uses the audio system configuration to look up the source location and direction of each incoming audio signal and renders a set of visual markers at the spatial origin of each. It then uses the audio signal properties for each sound to determine specific light visualizations. It may also render other static scene reference points, such as the venue walls, seating and a proscenium opening (i.e., part of a theater stage in front of the curtain).

Visual representation 108 may be implemented as a 2D or 3D visualization. The visual representation 108, may in some embodiments, include a light beam visualization from sound sources (e.g., speakers or beams). Alternatively, or in addition to, the visual representation 108 may add imagery of the venue or at least portions of the venue as an output. The visual representation 108 may be displayed using known or future display technology, such as display monitors, mobile computing devices with displays, wearable technology (e.g., glasses) or Augmented Reality (AR), Virtual Reality (VR) or Mixed Reality (MR) headsets.

Figure 2:
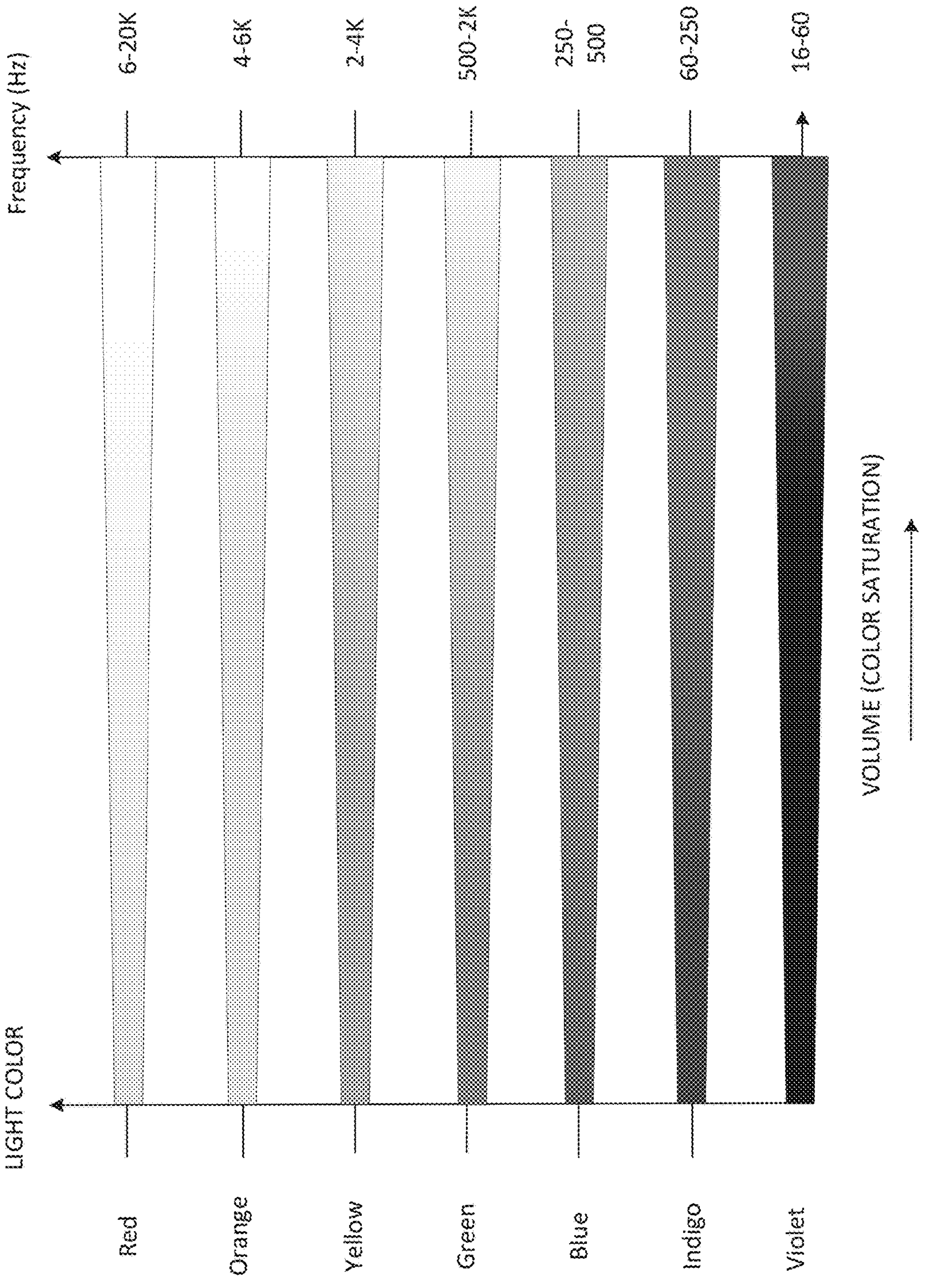
FIG. 2 illustrates an example spectral chart mapping of sound to light, according to some embodiments.

FIG. 2 illustrates a graph of light color visualizations as broken down by audio frequency ranges (i.e., bands or channels) in the 16-20K Hz audible range. When mapping a sound source to a visualization of sound coverage in the venue, unique colors representing each sound source or sound channel (e.g., frequency range) may be selected for a corresponding visualization.

Figure 6:
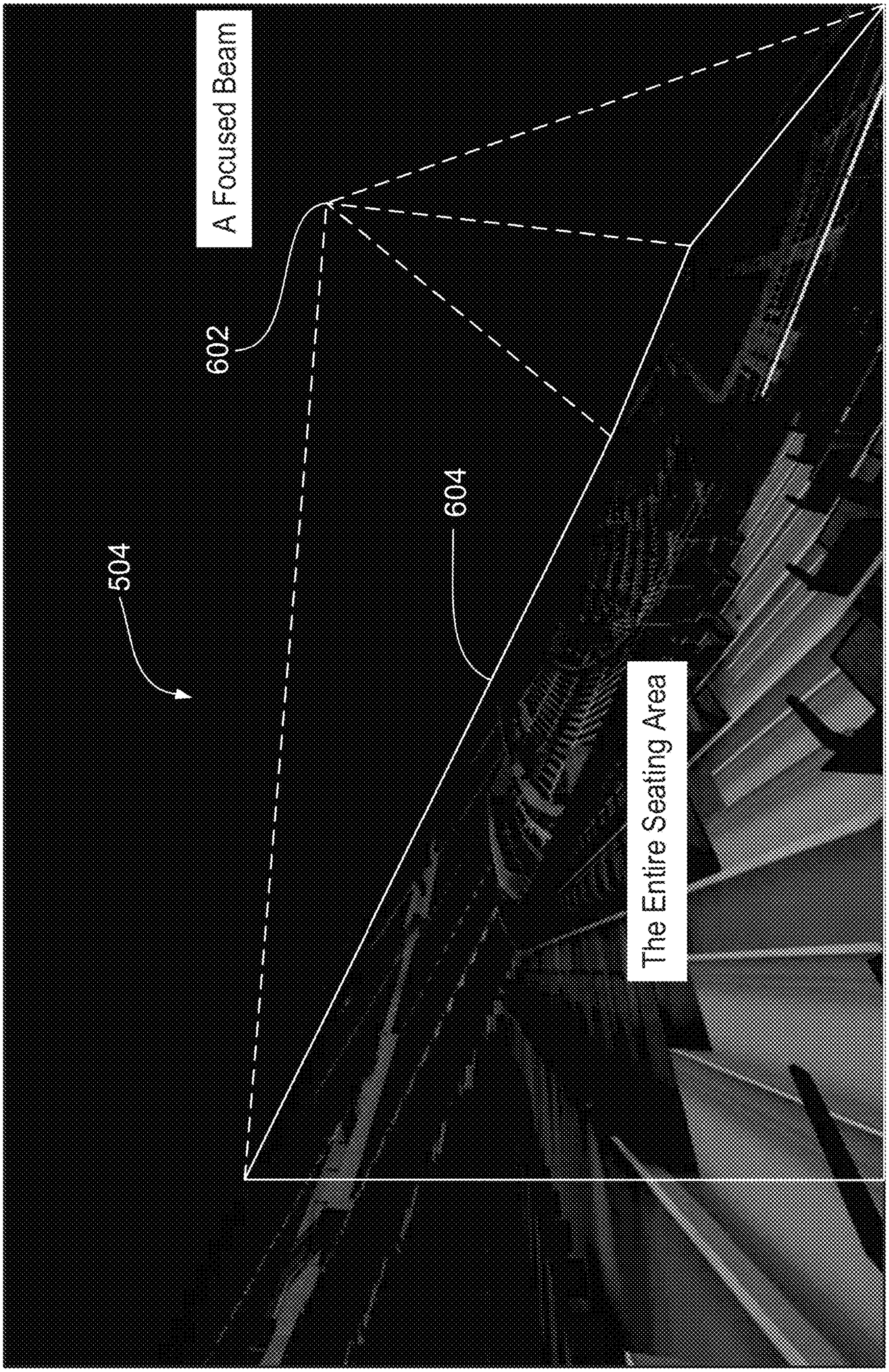
FIG. 6 illustrates an example visualization of acoustic coverage using light, according to some embodiments.

While specific color assignments and frequency ranges will be described hereafter, the ranges and color assignments may be different as shown without departing from the scope of the technology described herein. For example, other colors, frequencies and color intensity gradients may be chosen as desired as long as a separate color is assigned to defined audio sources, channels, ranges, etc. While FIG. 2 is illustrated in greyscale, the specific colors are represented from darkest shades (e.g., violet) for lowest frequency ranges (16-60 Hz) to brightest shades (e.g., red) for the highest frequency ranges (6-20K Hz). In addition, a sample shape of the light beam is shown as trapezoidal. However, the rendered beam of light representing the sound source coverage may have any geometric shape, aperture size, volume of light, or other geometric light properties as defined by the source type and/or sound configuration shape. For example, a focussed beam (shown in FIG. 5) may start at a point and fan out in a trapezoidal shape as it extends from the point, while a diffuse beam may start as a rectangle and fan out in a trapezoidal shape (as shown in FIG. 6).

In a first approach, the seven known colors of the visual spectrum are mapped to the seven known audio ranges. For example, sunlight splits into seven colors, namely Violet, Indigo, Blue, Green, Yellow, Orange, and Red (VIBGYOR). In addition, sound splits to commonly labeled ranges of sub-bass (16-60 Hz), bass (60-250 Hz), lower mid-range (250-500 Hz), mid-range (500-2K Hz), high mid-range (2-4K Hz), presence (4-6K Hz) and brilliance (6K-20K Hz). To illustrate volume intensity, the color saturation or brightness may be increased proportionally as the volume is increased. In this approach, a different color is assigned to each audio range. For example, as shown, the darkest colors are allocated to the lower frequency components and the brighter colors to the higher frequency components. As previously described, the specific color and frequency range assignments are for illustration purposes and may be varied to achieve differing visualizations.

In this first approach, loudspeakers may have a dedicated purpose, such as providing bass. In this scenario, each dedicated bass sound source may be mapped visually using a common color to illustrate overall bass coverage in a venue. Alternatively, or in addition to, each sound source may generate multiple audio ranges and the visualization may include one or more audio ranges using common colors for similar ranges. For example, a venue may have 20 sound sources each providing at least a first and a second audio range. Each of the first and second audio ranges is assigned a unique color and the visualization is generated for each audio range or for both ranges in a combined visualization. This approach may be applied to any audio range, combination of ranges or to specific sound effects.

Alternatively, or in addition to, in a second approach, separate sound sources (e.g., loudspeaker arrays or beams) may be collectively assigned separate colors to allow for distinguishing one sound source from another when sound coverage overlap occurs in the venue. In this approach, colors are not assigned to an audio range.

Alternatively, or in addition to, the two approaches may be combined. One skilled in the art will appreciate that other approaches or combinations may be implemented using the technology as described herein without departing from the scope of the disclosure.

Figure 3:
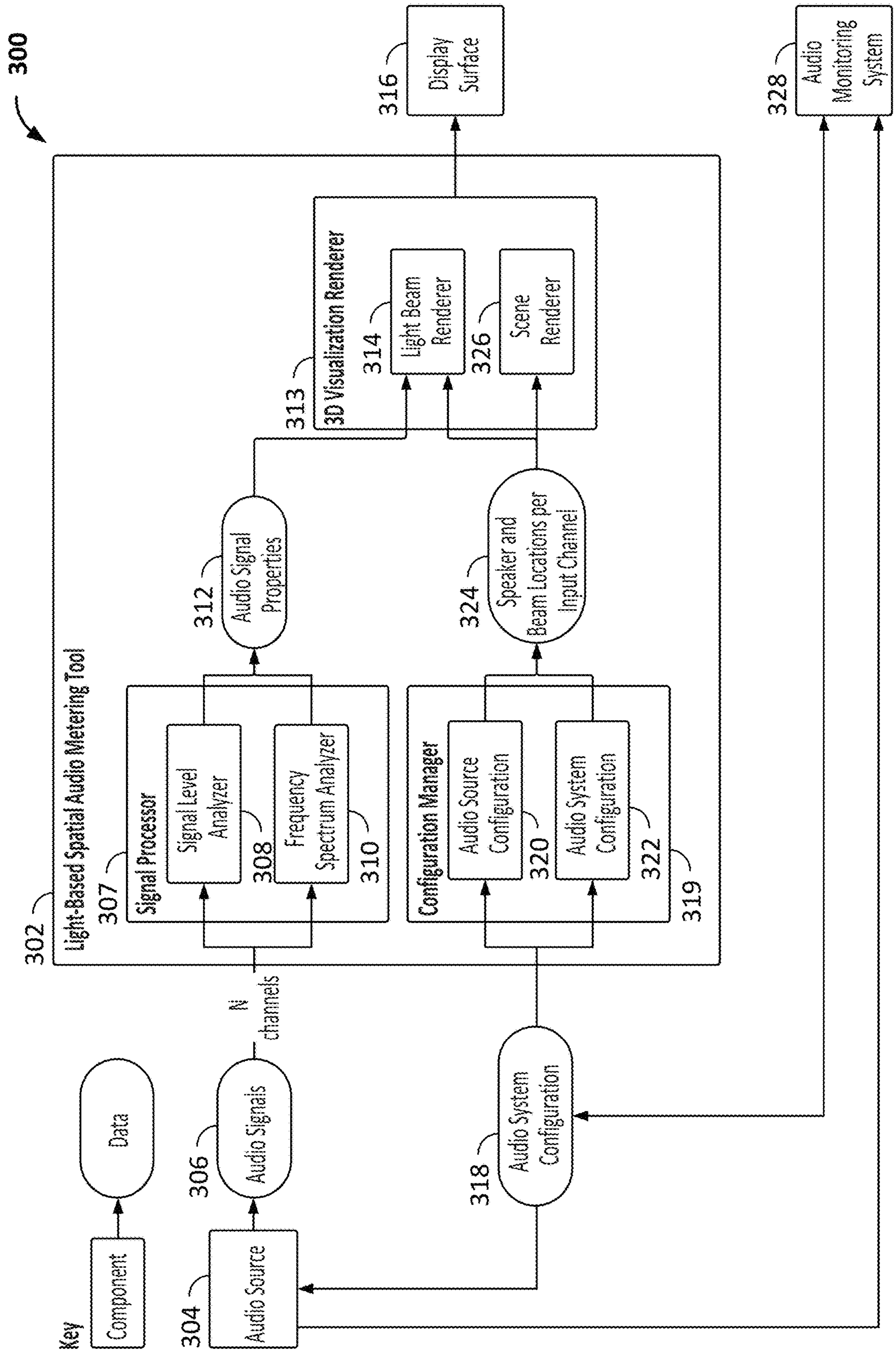
FIG. 3 illustrates an example block diagram of an audio visualizer system, according to some embodiments.

FIG. 3 illustrates a system 300 to process and analyze one or more audio sources to generate a visual representation of sound coverage, according to an example embodiment. System 300 can be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. System 300 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 300 or installed as a removable portion of the system 300.

The following descriptions are provided at a higher level of detail with respect to FIG. 1. In some embodiments, system 300 implements a visualization representation of one or more loudspeaker arrays or sound beams located within a venue. System 300 retrieves and analyzes audio content for signal properties, retrieves spatial configurations of sound sources located within the venue from a database and visualizes the spatial audio output of the retrieved configurations using properties of light.

Light-based Spatial Audio Metering Tool 302 provides visualization of sound coverage within a selected venue. As will be described in greater detail below, sound is analyzed and rendered as light beams that span from a loudspeaker or beam sound source to venue seat areas.

Audio source 304 may be a locally stored audio source, an external device, a streaming source, a software package which produces the audio signals to meter or any known or future audio source. Common examples are Digital Audio Workstation software packages and audio playback servers. Audio source 304 may be provided as audio signals 306 (n-channels) to loudspeakers, loudspeaker arrays, sound beams, etc. Audio signals may be arranged in multiple predetermined directions in a selected venue. Moreover, audio source 304 may generate audio signals 306 at different sound pressure levels (SPLs) (e.g., decibels) within a predetermined frequency range (e.g., from 20 Hz to 20 k Hz). In some embodiments, audio signals 306 may be generated from the audio source as, for example, a set of mono audio signals formatted for the specific audio system being metered. While described for mono audio signals, other known or future audio signal formats may be substituted as long as they can be analyzed for their frequency distributions.

Signal Processor 307 reads the audio signals in real-time and emits simplified signals which can be used to drive metering visualizations, such as an instantaneous level of the overall signal and its frequency components. The signal processor 307 may be implemented as a signal level analyzer 308 to detect volume or output power levels of frequency spectrum analyzer 310 to determine a frequency or range of frequencies of the audio signals, and an audio event analyzer to detect an onset of the audio signal. For example, see the various audio ranges previously illustrated in FIG. 2.

Configuration Manager 319 is a database (DB) containing the Audio Source Configuration 320 DB and Audio System Configuration 322 DB), such that it can be rapidly queried by the visualization tools. Configuration manager 319 DB is an in-memory representation of the external state of the system being monitored. This data is stored for the operation of the Light-Based Spatial Audio Metering Tool 302. Audio Source Configuration 320 DB is an in-memory representation of an object-based input configuration to the system being metered. Specifically, the mapping from input channels to source objects, and the current properties of source objects, such as their current spatial locations, and which subset of speakers they are currently targeting. Audio System Configuration 322 DB is an in-memory representation of the channel-based outputs from the audio system being metered. Specifically, this contains the geometry that is used to determine where and how to render light beams within the metering interface.

Referring back to FIG. 1, a database (DB) of loudspeaker and beam locations per input channel 104, provides a mapping of a specific venue's speaker/beam locations and parameters. This mapping represents one or more audio system configurations 318. Audio System Configuration 318 is the configuration and current state of an external audio system under control. Configuration includes the physical locations of the speakers/beams, and the mapping from input channels to physical outputs.

Audio system configurations, in some embodiments, may be a package of fixed data specifying the geometric properties of the speaker system being metered. Specifically, the locations and orientations of the individual speakers or beams comprising the system, and their capabilities and coverage patterns. This information may be used to initially create the signals within the audio source, and to map the resulting signals into three dimensions at the visualization stage.

Three Dimensional (3D) Visualization Renderer 313 synthesizes a 3D representation of the audio system and its metered (i.e., computed) audio data. The visualization is a combination of a static scene and a light-based overlay. To achieve this, the 3D visualization renderer communicates with the Configuration Manager 319 to look up the source location of each incoming Audio Signal and renders a set of visual markers at the spatial origin of each. It also receives the Audio Signal Properties 312 for each audio signal 306 as a signal level and frequency parameter to assign colors and intensities as previously described in FIG. 2. For example, the color and intensity of the light beam is a direct representation of the incoming Audio Signal Properties (e.g., signal level and frequency) for that light beam. 3D Visualization Renderer 313 may be implemented by Light Beam Renderer 314 that serves as a generic volumetric light renderer module to render a light beam which represents the Audio Signal 306. The shape and location of the beam is specified by the speaker and beam locations per input channel 324. Scene Renderer 326 renders a static scene where the visualizer uses the Audio System Configuration 322 to look up a source location and direction of each incoming Audio Signal 306 and renders a set of visual markers at the spatial origin of each. It may also render other static scene reference points, such as the venue walls, seating and proscenium opening. In a non-limiting example, a remote venue library (not shown) stores various remote venue images that can be presented in the scene renderer 326. The venue may be a real-world location or a fictitious location (e.g., simulation). The venue may be an outdoor venue or indoor venue.

Display Surface 316 displays the results of the 3D Visualization. The display surface may be a 2D display, or a 3D immersive display such as an Augmented or Virtual Reality headset.

Audio Monitoring System 328 may be an external listening system used in parallel to the metering tool 302 to listen to the audio signals 306 produced by the Audio Source 304. This may either be the actual audio system being metered, or an acoustic model of this system, such as a binaural renderer.

Figure 4:
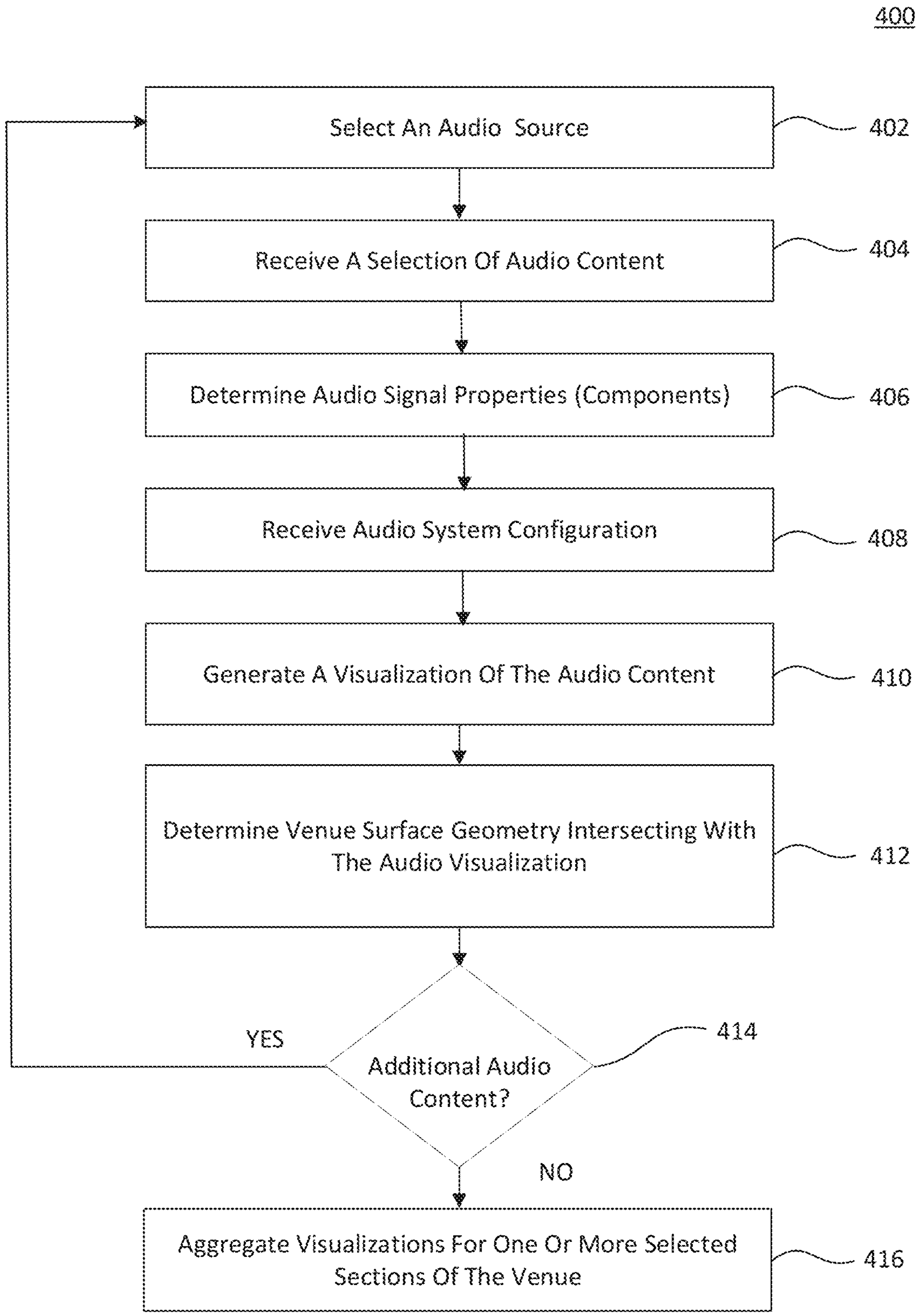
FIG. 4 illustrates a flowchart of an example method for visualizing audio for a sound source(s), according to some embodiments.
Figure 5:
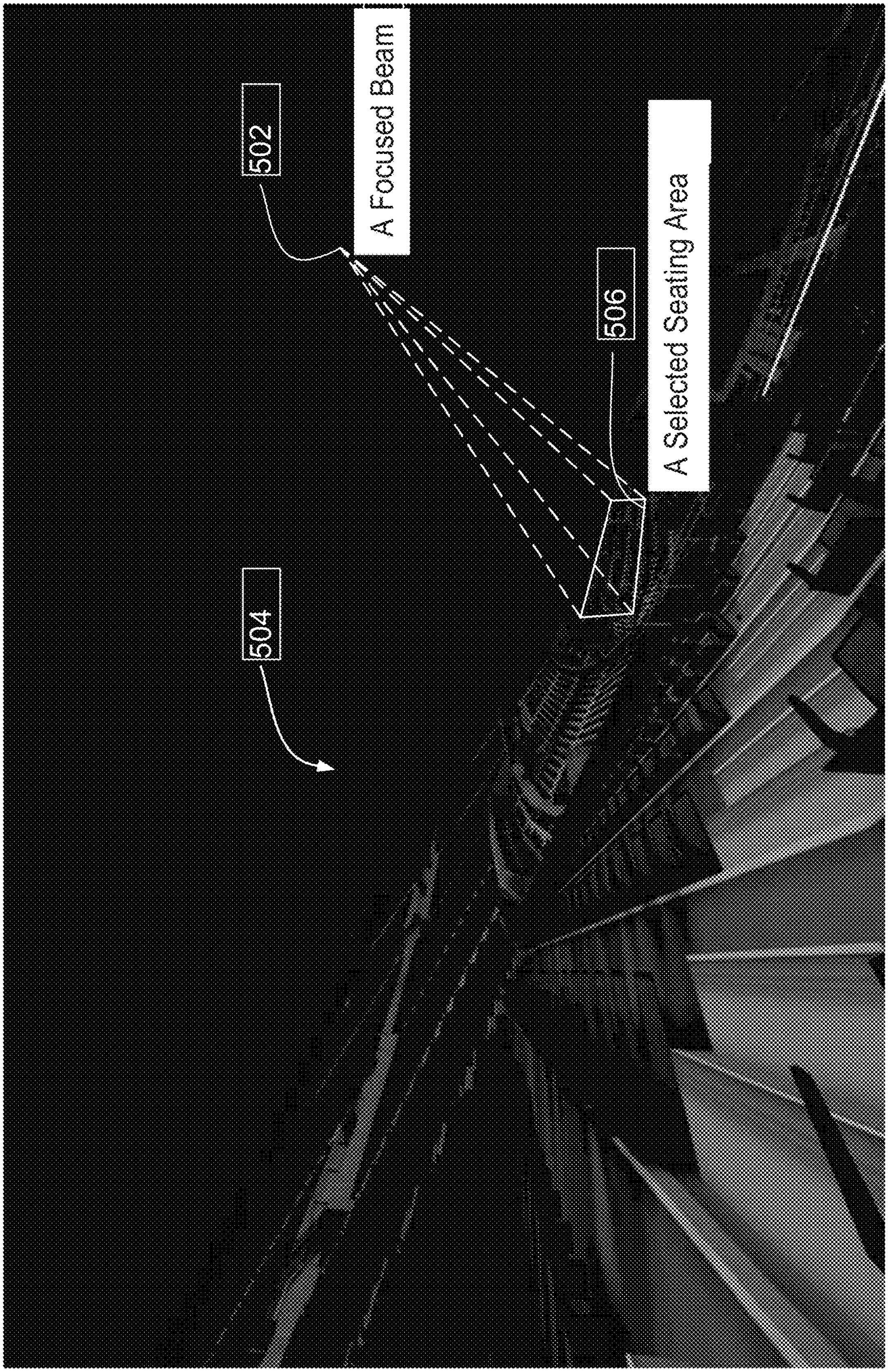
FIG. 5 illustrates an example visualization of acoustic coverage using light, according to some embodiments.

FIG. 4 illustrates a flowchart for a method of generating a visualization representation of one or more loudspeaker arrays located within a venue, according to some embodiments. Method 400 can be performed by processing logic that can comprise hardware (e.g., circuitry, dedicated logic, programmable logic, microcode, etc.), software (e.g., instructions executed on a processing device), or a combination thereof. It is to be appreciated that not all steps may be needed to perform the disclosure provided herein. Further, some of the steps may be performed simultaneously or in a different order than shown in FIG. 4, as will be understood by a person of ordinary skill in the art.

In 402, light-based spatial audio metering system, selects an audio source 304. The audio source may be local computer storage, an external device, streaming source, or a software package which produces the audio signals to meter.

In 404, light-based spatial audio metering system, receives audio content from the audio source (e.g., a song is selected from the audio source 304). The selected audio source may be provided as audio signals 306 to loudspeakers, loudspeaker arrays, sound beams, etc. in multiple predetermined directions, in a selected venue. Moreover, audio source 304 may generate audio signals 306 at different sound pressure levels (SPLs) (e.g., decibels) within a predetermined frequency range (e.g., from 20 Hz to 20 k Hz).

In 406, light-based spatial audio metering system, reads the audio signals in real-time and emits simplified signals which can be used to drive metering visualizations, such as instantaneous level of the overall signal and its frequency components. A signal processor 307 implementation may be used as a signal level analyzer 308 (e.g., to detect volume of output power levels) and frequency spectrum analyzer 310 to determine a frequency or range of frequencies of the audio signals. For example, see the various audio range previously illustrated in FIG. 2.

In 408, light-based spatial audio metering system, receives an audio system configuration of a selected venue. A database (DB) of loudspeaker and beam locations, per input channel 104, provides a mapping of a specific venue's speaker/beam locations and parameters. In one non-limiting example, a configuration manager for the venue may reflect one or more sets of loudspeakers and beams arranged in one or more arrays of varying numbers, sizes, types and power outputs of loud speakers. An audio system configuration is a package of fixed data specifying the geometric properties of the speaker systems being metered. In a non-limiting example, the geometric properties may be the locations and orientations of the individual speakers or beams comprising the system, and their capabilities and coverage patterns. This information is used to initially create the signals within the audio source, and to map the resulting signals into three dimensions at the visualization stage.

In 410, light-based spatial audio metering system, synthesizes a 3D representation of the audio system and its metered data. The visualization is a combination of a static scene and a light-based overlay. To achieve this, it uses the Audio System Configuration to look up the source location of each incoming Audio Signal and renders a set of visual markers at the spatial origin of each. It then uses the Audio Signal Properties 312 for each sound to determine light beam color and intensity. In some embodiments, Light Beam Renderer 314 may serve as a generic volumetric light renderer module used to render a light beam that represents a virtual representation of the Audio Signal 306.

In 412, light-based spatial audio metering system, determines the venue surface geometry intersecting with the audio visualization. The shape and location of the beam is specified by the Audio System Configuration 322. The color and intensity of the beam is a direct representation of the incoming Audio Signal Properties (e.g., signal level and frequency) for that beam. A static scene is rendered where the visualizer uses the Audio System Configuration 322 to look up a source location and direction of each incoming Audio Signal 306 and renders a set of visual markers at the spatial origin of each. It may also render other static scene reference points, such as the venue walls, seating and proscenium opening.

In 414, light-based spatial audio metering system, determines if additional audio content is to be visualized. If additional audio content is selected the process 402-412 is repeated for each new audio content. If no additional audio content is available, in 416, visualizations generated are aggregated in a static venue scene and displayed on a display surface 316. The display surface may be a 2D display, or a 3D immersive display such as an Augmented or Virtual Reality headset.

FIGS. 5-8 illustrate visual representations of potentially desirable sound coverages from one or more sound sources (e.g., speaker arrays) in a venue. While these various sound coverages may be detectable by audio equipment, the exact coverage areas may be difficult to understand for selected content. In addition, if a sound coverage mapping is needed in a virtual environment, the physical measuring of sound coverage patterns would not be applicable. Therefore, the technology as disclosed herein visualizes the sound coverages with volumetric light beams as discussed in FIGS. 1-3 within imagery of the venue.

Venue 504, shown as a partial seating section, may be shaped as a dome with seating configurations matching one or more curved sections of the venue. As such, the venue 504 may have an interior domed surface with geometrically distributed sound sources (e.g., loudspeakers/beams). As shown, a focused sound beam 502 sound source may be configured to be heard by a selected seating area 506 of venue 504. In some embodiments, a sound beam is generated by piezoelectric or electrostatic transducers (or arrays thereof). However, any known or future method of generating a sound beam for location specific audio coverage may be substituted without departing from the scope of the technology described herein. A visualization of this sound coverage pattern would provide a sound stage manager, for example, a quick way to check sound coverage for specific seating sections.

FIG. 6 illustrates another visual representation of sound coverage, from a sound source, in a venue. As shown, a wide coverage focus beam 602 sound source may be configured to be heard by an entire seating area 604 of venue 504. In some embodiments, wide sound beam 402 is generated by arrays of piezoelectric or electrostatic transducers. However, any known or future method of generating a wide sound beam for location specific audio coverage may be substituted without departing from the scope of the technology described herein. A visualization of this sound coverage pattern would provide a sound stage manager, for example, a quick way to check sound coverage for all seating sections.

Figure 7:
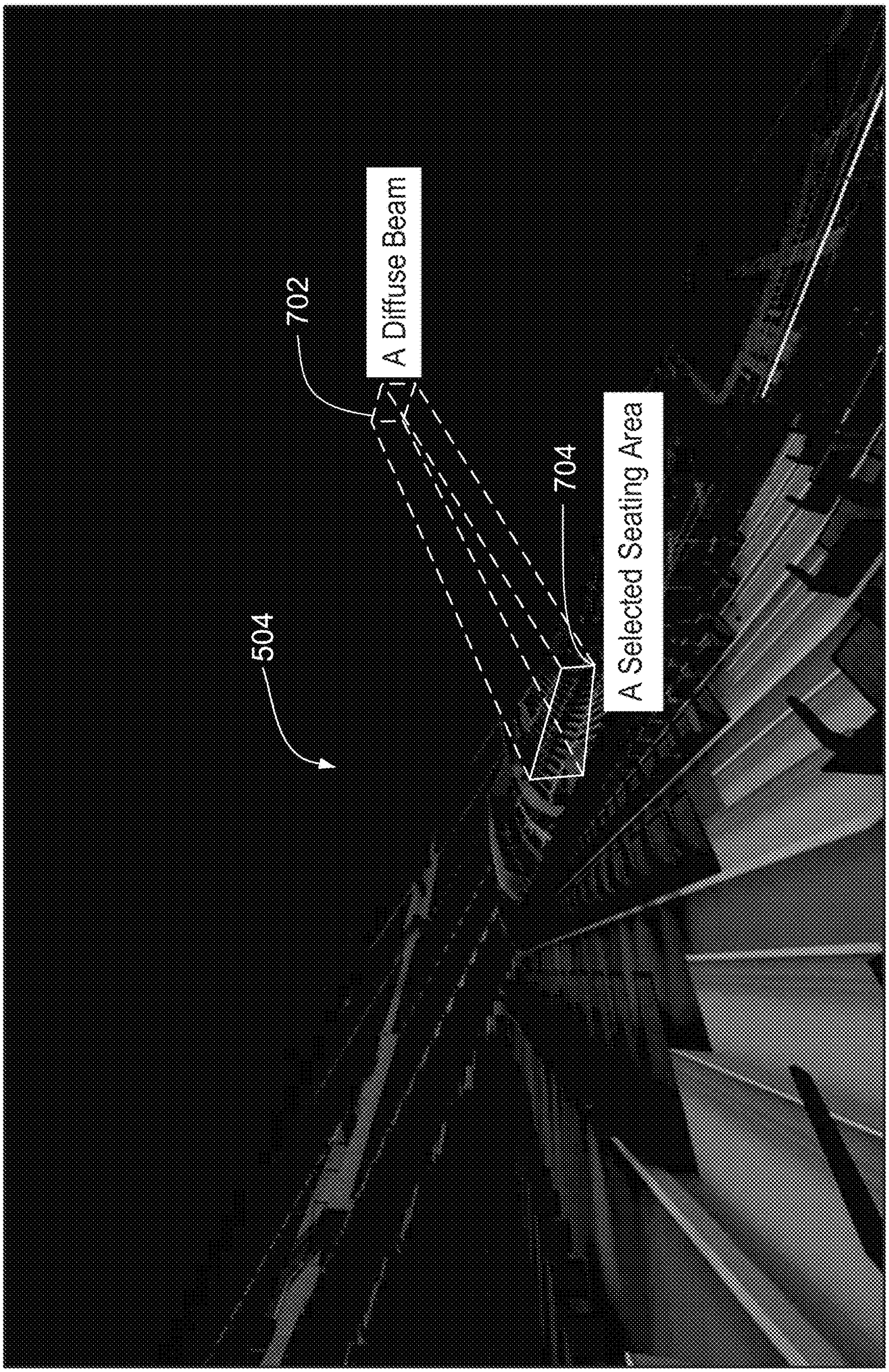
FIG. 7 illustrates another example visualization of acoustic coverage using light, according to some embodiments.

FIG. 7 illustrates another visual representation of sound coverage, from a sound source, in a venue. As shown, diffuse beam sound source 702 may be configured to be heard by selected seating area 704 of venue 504. Diffusion of sound may be important in concert halls, classrooms, studios and the like in order to avoid dead spots, places where the sound is weak or cannot be heard clearly. Diffused beams are generated by scattering the sound by surface variations of the sound source, such as deflecting or scattering surfaces. However, any known or future method of generating a diffused sound beam for location specific audio coverage may be substituted without departing from the scope of the technology described herein. A visualization of this sound coverage pattern would provide a sound stage manager, for example, a quick way to check sound coverage for a focused seating section.

Figure 8:
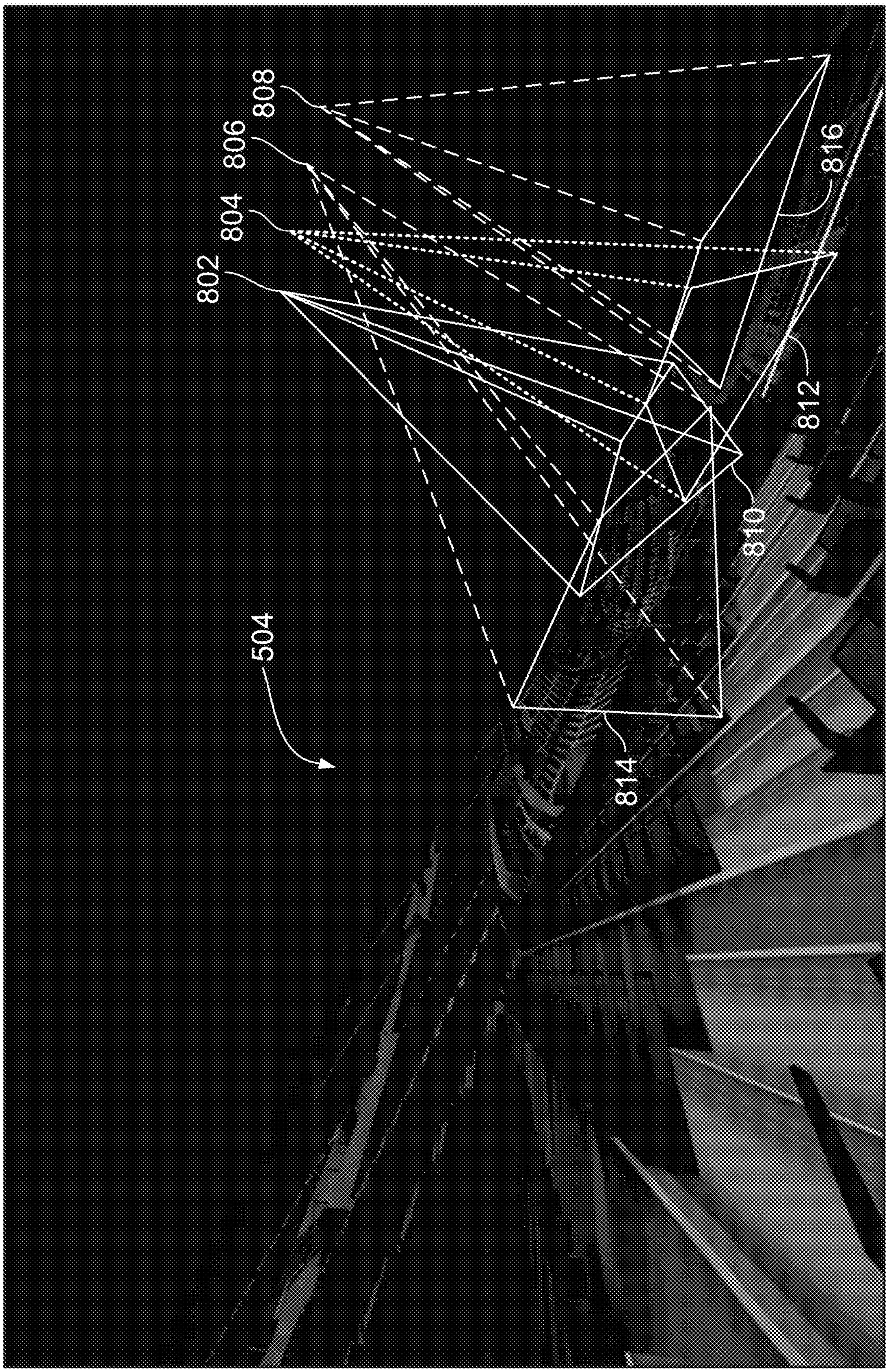
FIG. 8 illustrates another example visualization of acoustic coverage using light, according to some embodiments.

FIG. 8 illustrates a visual representation of sound coverage, from multiple sound sources, in a venue. As shown, a first sound source 802, a second sound source 804, a third sound source 806 and a fourth sound source 808 may be configured to be heard by selected seating areas 810, 812, 814 and 816, respectively, of venue 504. In this approach, one or more of the respective various sound coverages may overlap. In this scenario, a visualization of the sound sources would lead to an understanding of where coverage exists or where gaps may exist. Adjusting sound source configurations, such as, but not limited to, type, directivity, size, power, position or spectral properties may be necessary to fill any gaps or to eliminate unnecessary overlaps. Any known or future sound source may be substituted without departing from the scope of the technology described herein.

Figure 9:
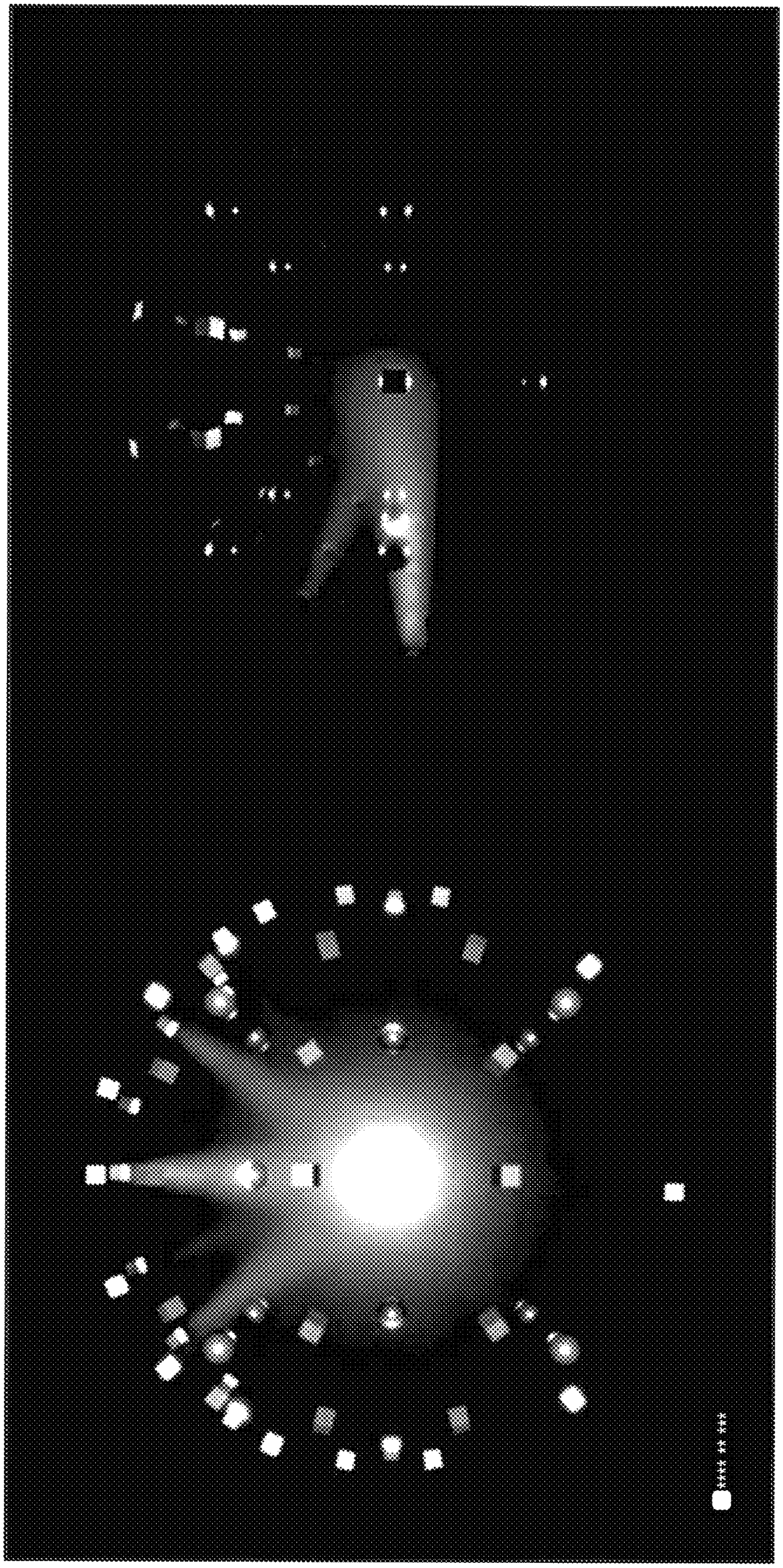
FIG. 9 illustrates an example visualization of an audio reverb effect, according to some embodiments.

FIG. 9 illustrates an example light beam visualization of an audio reverb effect using spatialization algorithms, according to some embodiments. FIG. 9 (Left) illustrates a top-down view of an example light beam visualization of a reverb algorithm output to a target 41-channel venue. FIG. 9 (Right) illustrates a side view of the example top-down view light beam visualization of a reverb algorithm output to a target 41-channel venue.

Figure 10:
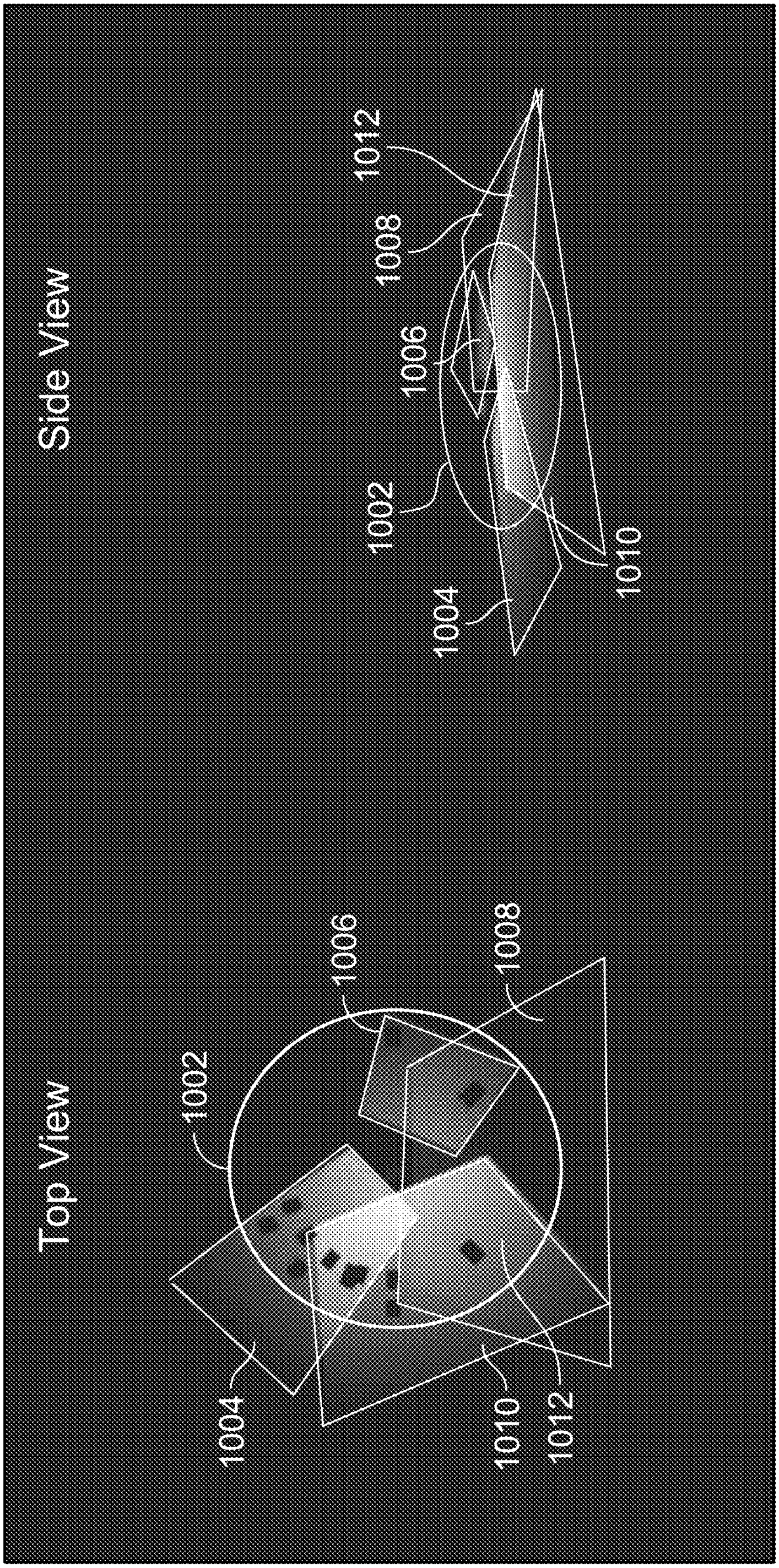
FIG. 10 illustrates an example visualization of spatial coverage and overlap, according to some embodiments.

FIG. 10 illustrates an example light beam visualization of spatial coverage and overlap using light color mixing for stem mixing and mastering, according to some embodiments. In some embodiments, the technology described herein implements monitoring of spatialization algorithms, spatial clustering of activated audio channels, and spatial stem mixing and mastering in a 2D (two-dimensional) display. Stem is a group of audio sources mixed together (e.g., 1202). Stem mixing is a technique based on creating groups of audio sources and processing them separately before a final master mix. Stem mastering is the final processing stage of the mix. Spatial stem mixing and mastering are the same techniques as above applied to spatial audio.

As shown, from a top view, a group of loudspeakers 1002 are arranged in a circular pattern of loudspeakers, loudspeaker arrays or sound beams located at the top of the venue (e.g., domed venue), in the air or at stage or ground level. However, the specific number, location and pattern of loudspeakers may be changed without departing from the scope of the technology described herein. As shown, speaker subsets produce a visualized sound coverage shown as 1004, 1006, 1008 and 1010. In addition, overlap 1012, between speaker set coverages may occur, for example, as shown between coverages 1004, 1008 and 1010. Therefore, the visualizations provide a representation of sound coverages to assist in the planning, placement, number selection, volume selection, etc. needed to provide sound coverage to specific venue seating areas. A side view of the sound coverages is also illustrated on the right side of FIG. 10. In a non-limiting example, a stage manager would view the various light beam visualizations of the various sound sources and determine if the coverages were as desired to produce sound coverages to expected seating sections or audience members and then make adjustments, such as beam forming adjustments, or adding or subtracting one or more speakers or sound beams to get to a better sound coverage pattern.

Figure 11:
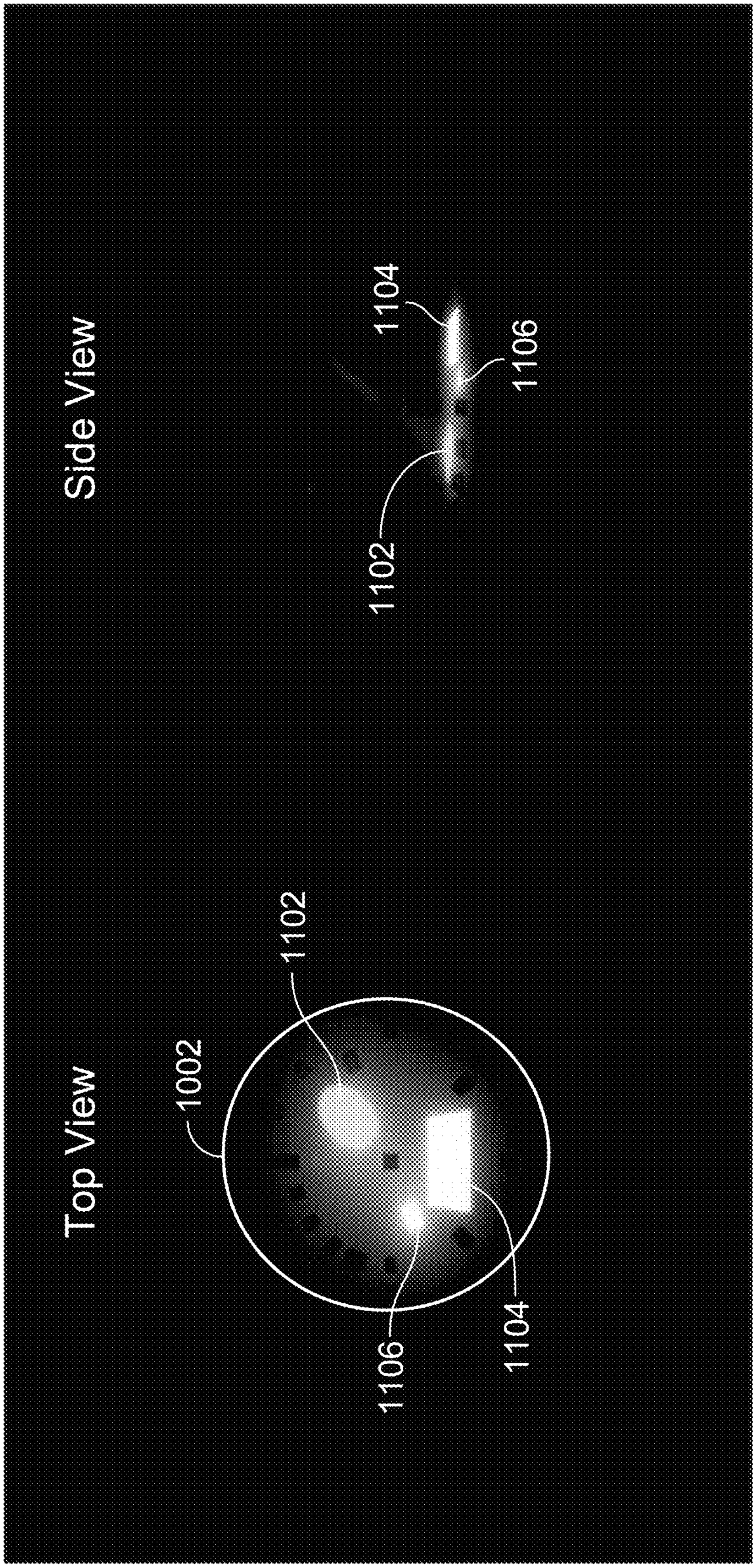
FIG. 11 illustrates an example visualization of directional sound configurations, according to some embodiments.

FIG. 11 illustrates an example visualization of directional sound configurations, according to some embodiments. As shown, loudspeaker arrays may achieve differing directions and shapes of sound coverage. Loudspeaker arrays or sound beams may be configured to achieve a shape of round or oval 1102, trapezoidal 1104 or square or rectangular 1106, to name a few. Shapes round or oval 1102 and trapezoidal 1104 illustrate a wider coverage and may be implemented with diffused sound surfaces or large arrays of loudspeakers/sound beams. Shapes square or rectangular 1104 illustrate a focused sound beam array or small loudspeaker subset. However, the specific shapes of loudspeaker coverage may be changed without departing from the scope of the technology described herein.

Figure 12:
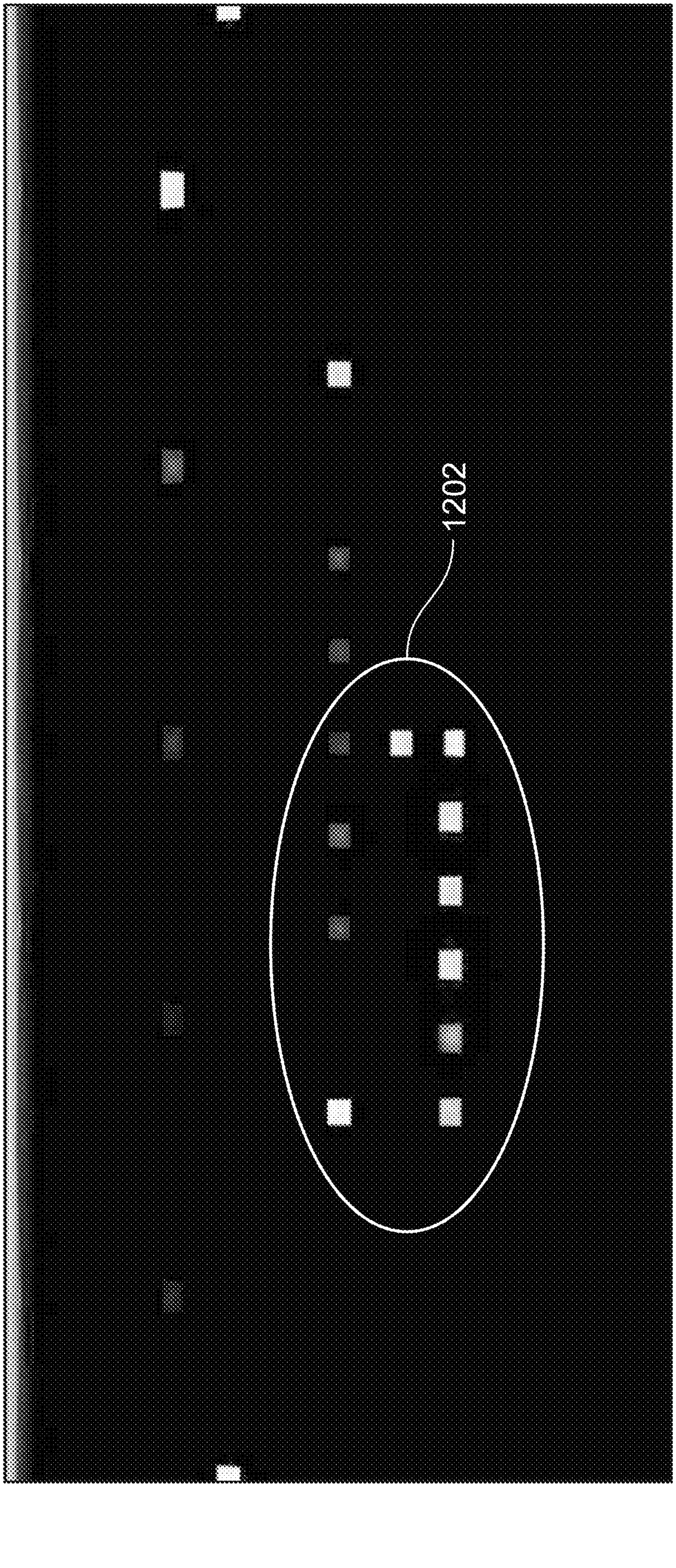
FIG. 12 illustrates an example visualization of spatial clustering, according to some embodiments.

FIG. 12 illustrates an equirectangular view of an example light beam that visualizes acoustic spread using light spread. Light-based spatial audio metering can help guide spatial mix decisions in digital audio production and in venue acoustics calibration.

However, spatial visualizations may be applicable to Extended Reality (XR), including, but not limited to, Virtual Reality (VR), Augmented Reality (AR), and Mixed Reality (MR) displays. For example, as shown, for a large loudspeaker set, a subset of loudspeakers 1202 have been activated in a spatial clustering.

Figure 13:
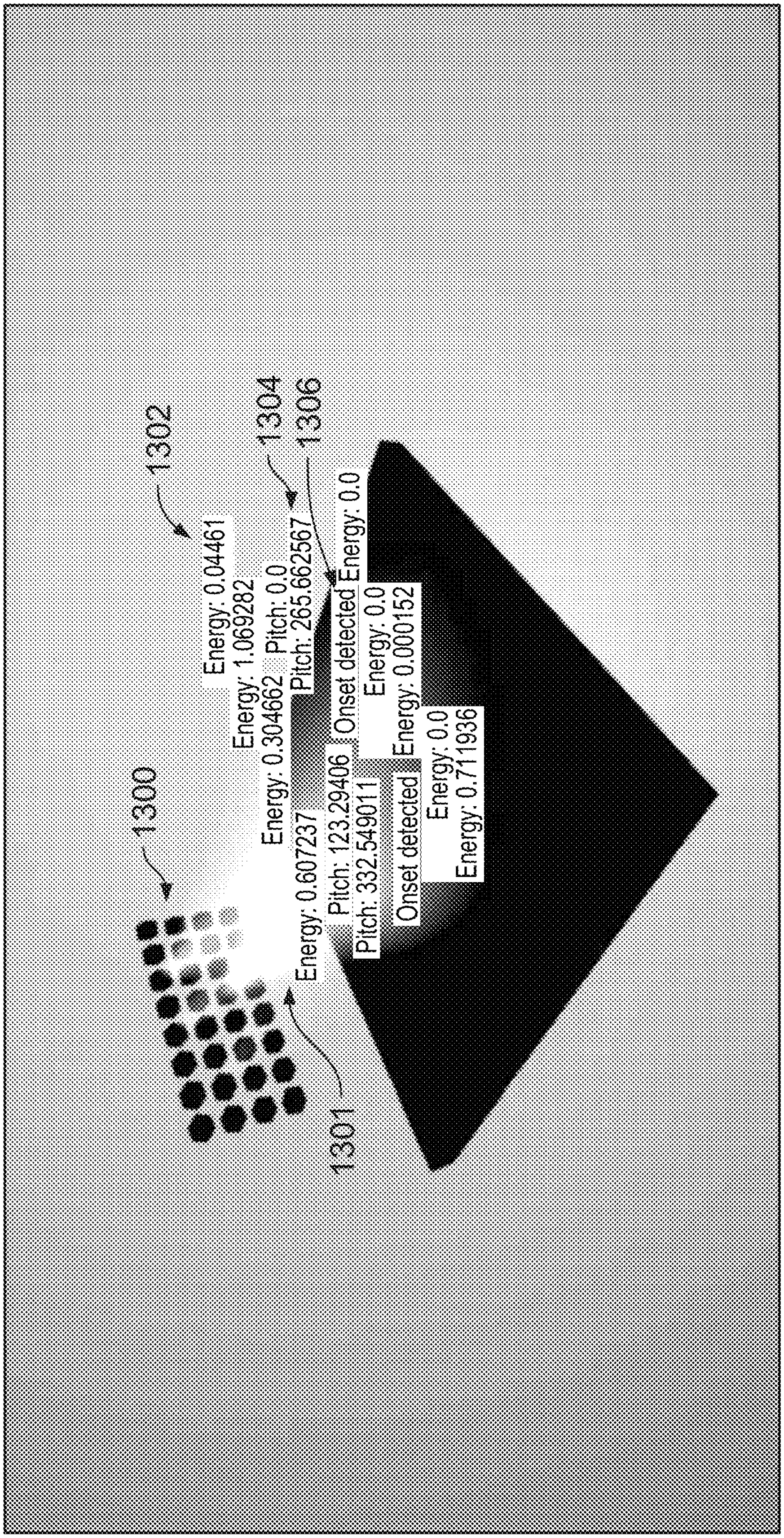
FIG. 13 illustrates an example light beam visualization using audio signal processing and pattern recognition results (energy, pitch, onset), according to some embodiments.

FIG. 13 illustrates an example light beam visualization 1301 of speaker array 1300 using audio signal processing and pattern recognition results (energy 1302, pitch 1304, and onset 1306) from one implementation of the Audio Analyzer (102).

Figure 14:
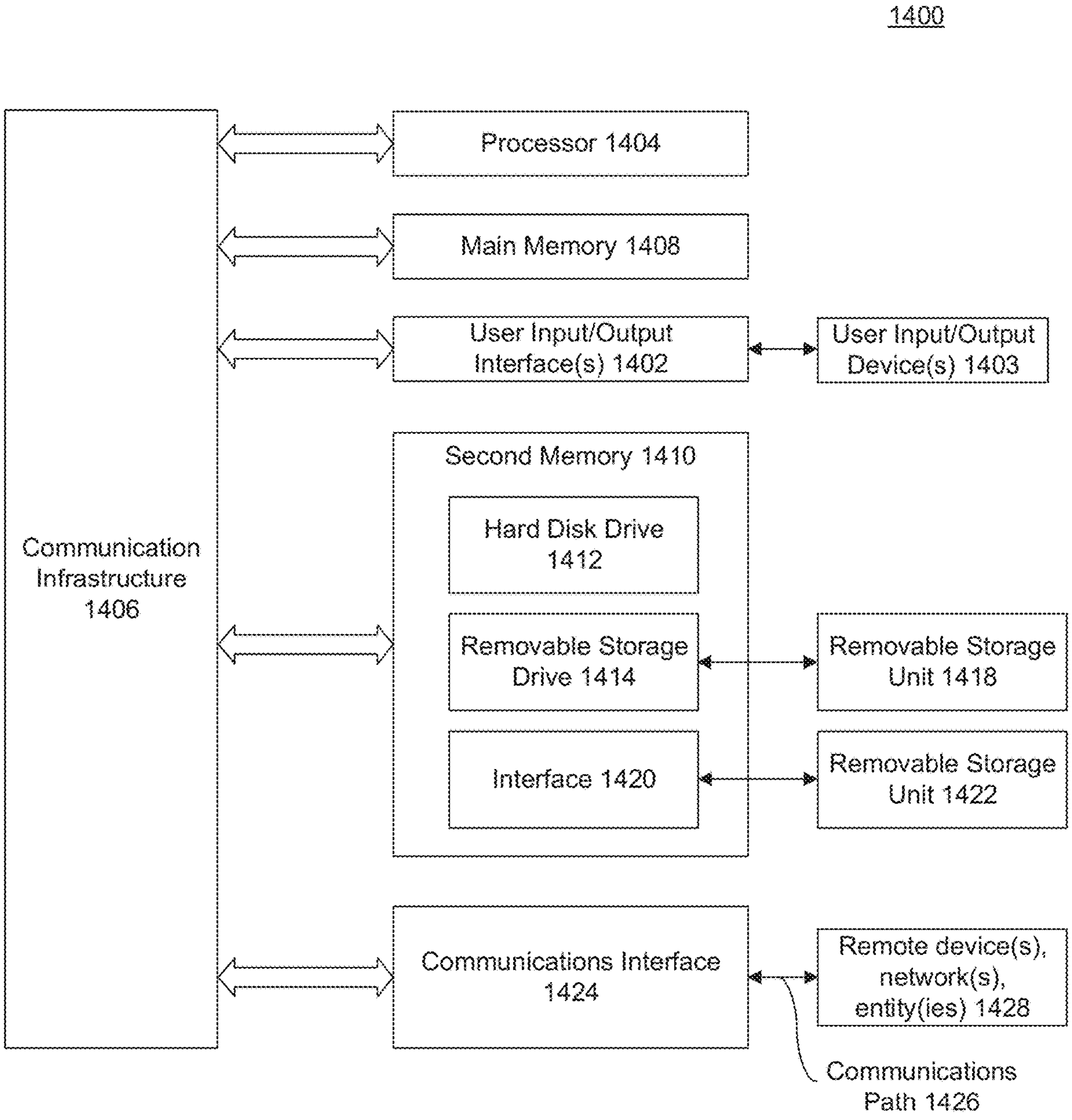
FIG. 14 illustrates an example computer system useful for implementing various embodiments.

Various embodiments may be implemented, for example, using one or more well-known computer systems, such as computer system 1400 shown in FIG. 14. One or more computer systems 1400 may be used, for example, to implement any of the embodiments discussed herein, as well as combinations and sub-combinations thereof.

Computer system 1400 may include one or more processors (also called central processing units, or CPUs), such as a processor 1404. Processor 1404 may be connected to a communication infrastructure or bus 1406.

Computer system 1400 may also include user input/output device(s) 1402, such as monitors, keyboards, pointing devices, etc., which may communicate with communication infrastructure 1406 through user input/output interface(s) 1402.

One or more processors 1404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 may also include a main or primary memory 1408, such as random access memory (RAM). Main memory 1408 may include one or more levels of cache. Main memory 1408 may have stored therein control logic (i.e., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1418. Removable storage unit 1418 may include a computer-usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 may read from and/or write to a removable storage unit 1418.

Secondary memory 1410 may include other means, devices, components, instrumentalities or other approaches for allowing computer programs and/or other instructions and/or data to be accessed by the computer system 1400. Such means, devices, components, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 may enable computer system 1400 to communicate and interact with any combination of external devices, external networks, external entities, etc. (individually and collectively referenced by reference number 1428). For example, communication interface 1424 may allow computer system 1400 to communicate with external or remote devices 1428 over communications path 1426, which may be wired and/or wireless (or a combination thereof), and which may include any combination of LANs, WANs, the Internet, etc. Control logic and/or data may be transmitted to and from computer system 1400 via communication path 1426.

Computer system 1400 may also be any of a personal digital assistant (PDA), desktop workstation, laptop or notebook computer, netbook, tablet, smartphone, smartwatch or another wearable, appliance, part of the Internet-of-Things, and/or embedded system, to name a few non-limiting examples, or any combination thereof.

Computer system 1400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 14. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. An audio visualization system, comprising:

a signal processor configured to analyze a plurality of audio signals in real-time to determine properties of each of the plurality of audio signals, wherein the properties include at least an instantaneous level and an audio frequency component, and wherein the plurality of audio signals are sourced from a plurality of speakers arranged in multiple predetermined locations in a venue;

a configuration manager configured to retain a configuration of the plurality of speakers, wherein the configuration includes respective locations of the plurality of speakers within the venue, respective speaker emission directions, and audio maps of the respective instantaneous level and audio frequency components for the plurality of audio signals to one or more of the plurality of speakers; and a three dimensional visualization renderer configured to synthesize, based on the configuration of the plurality of speakers, a three dimensional representation of the instantaneous level and the audio frequency component of each of the plurality of audio signals, wherein the three dimensional representation is a combination of a static scene of at least a portion of the venue and a plurality of light-beam overlays.

2. The audio visualization system of claim 1, wherein the plurality of light-beam overlays each comprise a unique color volumetric beam of light.

3. The audio visualization system of claim 1, wherein the three dimensional visualization renderer is further configured to communicate with the configuration manager to look up a source location of each of the plurality of audio signals and rendering, within the static scene, a set of visual markers at a spatial origin of each audio signal.

4. The audio visualization system of claim 3, wherein the three dimensional visualization renderer is further configured to map an intersection of light beams from the spatial origin to one or more surfaces of the portion of the venue.

5. The audio visualization system of claim 1, wherein the signal processor is further configured to assign a color for each of the audio frequency components.

6. The audio visualization system of claim 5, wherein the signal processor is further configured to assign, for each of the audio frequency components, an intensity of the color based on the respective instantaneous level of the plurality of audio signals.

7. The audio visualization system of claim 1, wherein the three dimensional visualization renderer is further configured to render reference points within the static scene to include any of: venue walls, venue seating, a venue stage, or a venue proscenium opening.

8. The audio visualization system of claim 1, further comprising a remote venue library that stores various remote venue images that are presented in the synthesizing of the static scene.

9. The audio visualization system of claim 1, wherein the venue may be any of: a real-world location, a simulation of a fictitious location, an outdoor venue, or an indoor venue.

10. The audio visualization system of claim 1, wherein the three dimensional representation is displayable within an environment including any of: an extended reality, virtual reality, augmented reality or mixed reality.

11. The audio visualization system of claim 1, wherein the three dimensional visualization renderer is further configured to aggregate the audio frequency components into bands of frequencies, wherein the bands of frequencies are rendered together as a single light beam.

12. The audio visualization system of claim 11, wherein the bands of frequencies comprise audio signals of any of: a drum, a bass, a melody, or a vocal band.

13. The audio visualization system of claim 1, wherein the plurality of speakers comprises any of: individual speakers, an array of speakers, or a sound beam.

14. The audio visualization system of claim 1, wherein the venue is substantially a dome.

15. A system, comprising:

a memory; and a processor coupled to the memory and configured to perform operations comprising:

analyzing a plurality of audio signals for a plurality of speakers arranged in multiple predetermined locations in a venue;

determining, in real-time, properties of each of the plurality of audio signals, wherein the properties include at least an instantaneous level and audio frequency components;

retaining a configuration of the plurality of speakers, wherein the configuration includes respective locations of the plurality of speakers within the venue, respective speaker emission directions, and audio maps of the respective instantaneous level and audio frequency components for the plurality of audio signals to one or more of the plurality of speakers; and rendering, based on the audio maps, a three dimensional representation of the properties, wherein the three dimensional representation is a combination of a static scene of at least a portion of the venue and a plurality of light-beam overlays.

16. The system of claim 15, wherein the plurality of light-beam overlays each comprise a unique color volumetric beam of light.

17. The system of claim 15, the operations further comprising looking up a source location of each of the plurality of audio signals and rendering, within the static scene, a set of visual markers at a spatial origin of each audio signal.

18. The system of claim 15, the operations further comprising assigning, for each of the audio frequency components, an intensity of a color based on the respective instantaneous levels of the audio frequency components.

19. The system of claim 15, wherein the configuration further includes audio signal geometric properties including any of: location, orientation, size, number of sound beams, shape of an array of sound beams, or coverage patterns.

20. A non-transitory computer-readable device having instructions stored thereon that, when executed by at least one computing device, cause the at least one computing device to perform operations comprising:

analyzing a plurality of audio signals for a plurality of speakers arranged in multiple predetermined locations in a venue;

determining, in real-time, properties of each of the plurality of audio signals, wherein the properties include at least an instantaneous level and audio frequency components;

retaining a configuration of the plurality of speakers, wherein the configuration includes respective locations of the plurality of speakers within the venue, respective speaker emission directions, and audio maps of the respective instantaneous level and audio frequency components for the plurality of audio signals to one or more of the plurality of speakers; and rendering, based on the audio maps, a three dimensional representation of the properties, wherein the three dimensional representation is a combination of a static scene of at least a portion of the venue and a plurality of light-beam overlays.

* * * * *